(No Model.)
J. M. KIRKER, McG. MILLER & J. A. WILLIAMS.
ELECTRIC BRANDING STAMP.
No. 574,203. Patented Dec. 29, 1896.
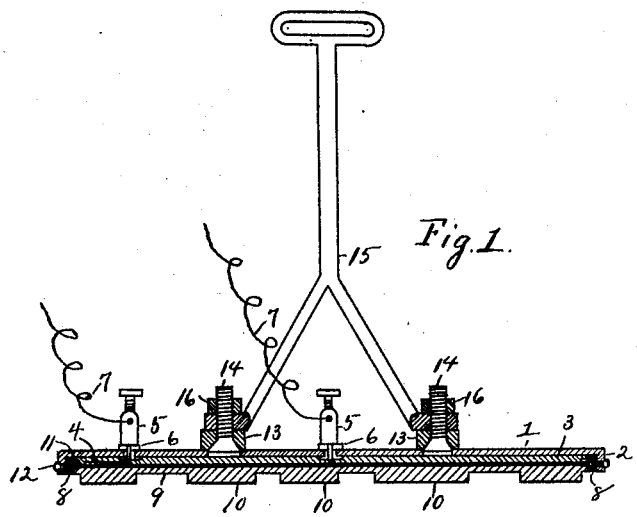
Fig. 1.
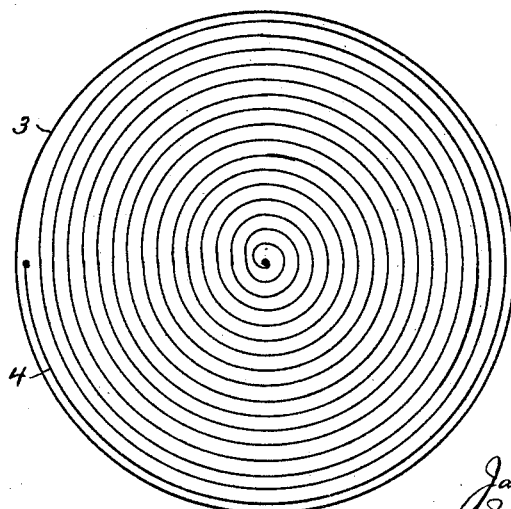
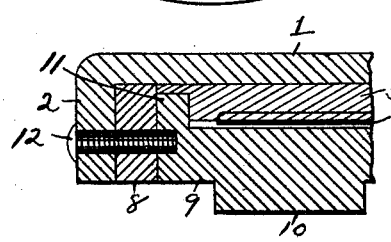
Witnesses
E. C. Catts
Sigel Brown
James M. Kirker
McGonigale Miller and
James A. Williams
Inventors
By Glascock &c.
Attorneys

UNITED STATES PATENT OFFICE.

JAMES M. KIRKER, McGONIGALE MILLER, AND JAMES A. WILLIAMS, OF LOUISVILLE, KENTUCKY.

ELECTRIC BRANDING-STAMP.

SPECIFICATION forming part of Letters Patent No. 574,203, dated December 29, 1896.

Application filed March 16, 1896. Serial No. 583,421. (No model.)

*To all whom it may concern:*

Be it known that we, JAMES M. KIRKER, MCGONIGALE MILLER, and JAMES A. WILLIAMS, citizens of the United States, residing at Louisville, in the county of Jefferson and State of Kentucky, have invented a certain new, useful, and valuable Improvement in Electric Burning-Brands, of which the following is a full, clear, and exact description.

Our invention has relation to electric burning-brands; and it consists in the novel construction and arrangement of its parts, as hereinafter described.

In the accompanying drawings, Figure 1 is a side view of the burning-brand, partly in section. Fig. 2 is a plan view of the heating-wire and the plate to which it is attached. Fig. 3 is a detail view of a portion of the brand in section.

The brand consists of the plate 1. Said plate is preferably circular in shape and is provided at its periphery with the downwardly-extending annular flange 2. To the under side of the plate 1 is secured a non-heat-conducting plate 3. Said plate 3 may be made of asbestos or any other suitable material. To the under side of the plate 3 is secured by cement or other suitable agency the wire or electric conductor 4. Said wire or conductor 4 is of high resistance, so that when a current of electricity is passed through it it will become heated. Said wire or conductor 4 is connected at either end with a post 5 5, said posts being located in top of the plate 1 and being insulated therefrom by the insulation 6 6. The said posts 5 5 are connected with the positive and negative poles of an electrical generator by means of the wires 7 7, said wires being provided with suitable insulation.

About the inner side of the flange 2 is located an annular strip of non-heat-conducting material 8.

The brand proper consists of a metallic plate 9, having raised thereon the characters, letters, or emblems, as indicated by the portions 10 10 in Figs. 1 and 3. Said plate 9 is provided about the periphery of its upper edge with the upwardly-extending annular flange 11, and when said plate 9 is in position the flange 11 fits in a suitable depression made in the plate 3. (See Fig. 3.) The plate 9 is secured in place by means of screws 12, which pass laterally through the flange 2 and through the strip 8 and enter suitable threaded perforations in the plate 9, as shown in Fig. 3. The upper surface of the plate 9 comes in contact, or nearly so, with the wire 4, and when a current of electricity is passed through said wire the heat is transmitted to the said plate 9, which is used for burning brands on boxes, barrels, or for branding cattle.

It will be seen that the plate 9 may be readily removed by removing the screws 12 and a new branding-plate may be inserted in its stead.

The upper surface of the plate 1 is provided with the perforated protrusions 13 13, in which are located the screw-threaded bolts 14 14, the threaded ends extending upward. A handle 15, having a bifurcated end, is attached to the bolts 14 14 by means of perforations in the bifurcated ends that receive the bolts, the nuts 16 16 retaining said ends in position on the bolts.

Having described our invention, what we claim as new, and desire to secure by Letters Patent, is—

1. An electric branding-stamp consisting of a plate, an annular flange located on said plate, a second plate composed of non-heat-conducting material secured to the under side of said first plate; an electric conductor secured to the under side of the said non-heat-conducting plate, said electric conductor being connected with an electric generator; a metallic plate located within the annular flange of the first said plate screws passing through said annular flange and securing said metallic plate in position, the upper surface of the last said plate coming in contact or close proximity with the electric conductor, the under side of the last said plate being provided with suitable characters.

2. An electric branding-stamp consisting of a plate, an annular flange located on said plate, a second plate composed of non-heat-conducting material secured to the under side of said first plate; an electric conductor secured to the under side of the said non-heat-conducting plate, said electric conductor being connected with an electric generator; a metallic plate located within the annular flange of the first said plate, a non-heat-conducting strip interposed between the edge of the last said plate and the said annular flange; screws passing through said annular flange and securing said metallic plate in position, the upper surface of the last said plate coming in contact or close proximity with the electric conductor, the under side of the last said plate being provided with suitable characters.

In testimony whereof we affix our signatures in presence of two witnesses.

JAMES M. KIRKER.
McGONIGALE MILLER.
JAMES A. WILLIAMS.

Witnesses:
JOHN HORNE,
J. CARL JOHNSTON.